May 3, 1932.     A. Y. DODGE     1,856,070
BRAKE
Filed Oct. 30, 1926

INVENTOR
ADIEL Y. DODGE
BY
M.W. McConkey
ATTORNEY

Patented May 3, 1932

1,856,070

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 30, 1926. Serial No. 145,189.

This invention relates to brakes and is illustrated as embodied in an internal expanding brake for an automobile. An object of the invention is to improve the general organization of a brake of this character, especially with respect to the positioning and anchoring of the shoes and the manner in which one shoe may be arranged to apply a different shoe.

One feature of novelty relates to arranging a pair of unconnected shoes in such a manner that they have direct thrust engagement with each other so that one shoe applies the other. Preferably the engaging ends of the shoes are formed with rounded thrust surfaces which may take the form of flanges extending integrally from stampings from which the shoes are built up.

Another feature of the invention has to do with positioning the shoes when the brake is released by providing a novel automatically-adjusted stop which is preferably secured to and carried by the shoe itself. In one desirable arrangement the stop is arranged to engage and be operated by a novel steady rest,—that is, a device arranged to resist lateral movement of the shoe.

Another feature of the invention relates to providing one end of the retarding device, that is, one end of one of the shoes in the illustrated form, with a separate anchor device, while the opposite end is arranged to anchor when the drum is turning in the opposite direction against a part of the brake-applying means, for example on a bracket carrying the brake-applying shaft and having a novel mounting shown as including fastenings seated against the ends of slots in the backing plate of the brake to transmit the braking torque to the backing plate.

The above and other objects and features of the invention, including various novel combinations of parts and desirable particular constructions, will be apparent from the following description of one illustrative embodiment shown in the accompanying drawings, in which.

Figure 1:
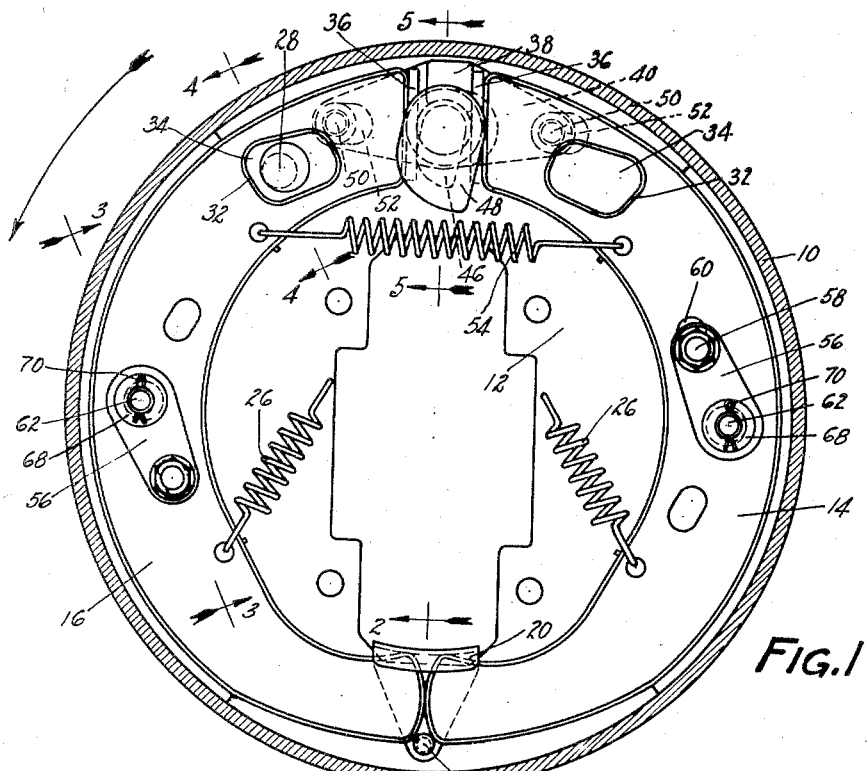
Figure 1 is a vertical section through the brake just inside the head of the brake drum and showing the brake shoes in side elevation.
Figures 2, 3, 4:
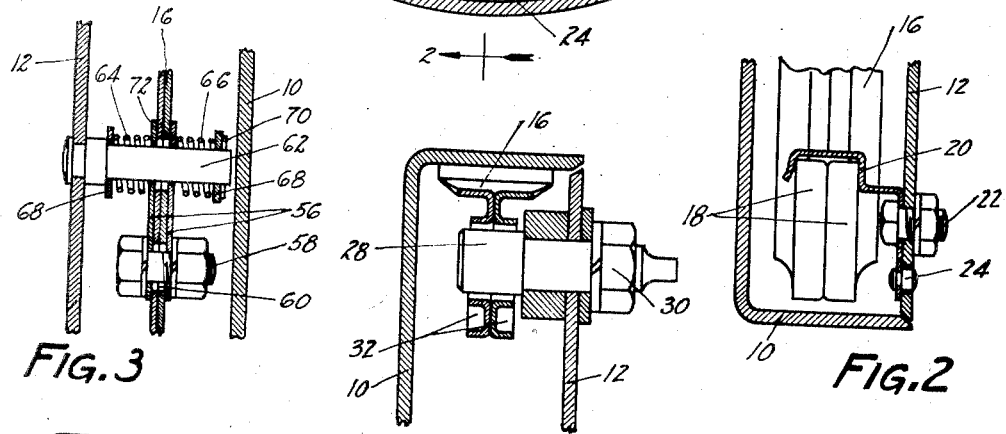
Figure 2 is a partial radial section through the brake on the line 2—2 of Figure 1, showing one of the shoes in end elevation.
Figure 3 is a partial section on the line 3—3 of Figure 1, showing the automatic adjustment.
Figure 4 is a partial radial section through the brake on the line 4—4 of Figure 1 showing the separate anchor.
Figure 5:
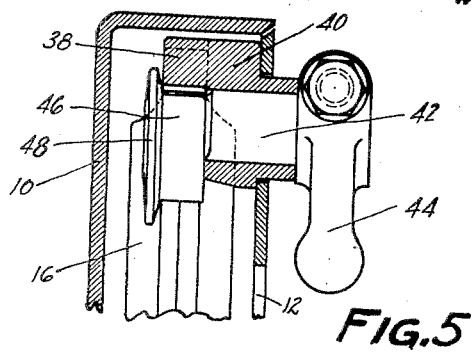
Figure 5 is a partial radial section on the line 5—5 showing the brake-applying means.

The illustrated brake includes a rotatable drum 10, at the open side of which there may be arranged a suitable backing plate 12 and within which is arranged the retarding means of the brake, which in this particular embodiment takes the form of a pair of arcuate and substantially rigid shoes 14 and 16 which are preferably interchangeable. In the arrangement illustrated, each of the shoes 14 and 16 is built up of a pair of stampings of general channel form which are riveted or spot-welded or otherwise secured together back to back.

The above-described brake shoes are arranged to form a brake of the "duo servo" type,—that is, the shoe 16 applies the shoe 14 when the drum is turning in a counter-clockwise direction, while the shoe 14 applies the shoe 16 when the drum is turning in a clockwise direction. The shoes are not, however, connected in any way but are rounded at their lower ends to form thrust surfaces in direct engagement with each other, these surfaces being shown as formed by flanges 18 extending across the ends of the channel-shaped stampings making up the shoes. The shoes are kept in alinement with each other by a guide member such as a stamping 20 secured to the backing plate 12 by a bolt 22 and held from turning by a stud 24. The guide 20 has a part engaging the adjacent ends of shoes 14 and 16 on their opposite sides to hold them in end-to-end alinement and also has a part extending across these ends and engaged by the ends to position them radially of the drum. The shoes are urged inwardly away from the drum and upwardly against the guide 20 at their lower ends by suitable springs 26 connected at their lower ends to the shoes and at their upper ends to the backing plate 12.

When the drum is turning in a counter-clockwise direction (that is, in the opposite direction from that shown in Figure 1) shoe 16 anchors against a separate eccentric adjustable stop or anchor 28 secured to the backing plate 12 by a nut 30 and engaged by thrust flanges 32 drawn outwardly in opposite directions from the two stampings making up the shoe about an opening 34 through which the anchor passes. The stop or anchor 28 is illustrated as passing through washers or spacers on opposite sides of the backing plate. When the drum is turning in a counter-clockwise direction, as illustrated in Figure 1, the torque of the brake is taken by direct engagement of the wear plate 36 at the end of shoe 14 with an anchor projection or stop 38 formed on a bracket 40 in which is journalled at its center a shaft 42 operated by a lever 44 and carrying a cam 46 engaging the wear plate 36 of shoe 16 and provided with an end flange 48 positioning laterally the upper ends of the shoes 14 and 16. The bracket 40 is held by a pair of fastenings such as bolts 50 passing through elongated slots 52 in the backing plate. Fastenings 50 are free to shift in the openings 52 but are normally at the left of the elongated slots 52 so that in the counter-clockwise direction of drum rotation the braking torque is transmitted to the backing plate 12 through the engagement of the bolts 50 with the left-hand ends of the slots 52. A suitable return spring 54 is provided to resist the brake-applying movement of the shoes when the cam 46 is operated.

Each of the shoes is preferably provided with an automatically-adjusted stop including a pair of members 56 lying flat against the opposite sides of the web of the shoe and frictionally clamped at their ends to the shoe by a bolt 58 passing through a slot 60. Passing through the other end of each of the pair of members 56 is a device 62 in the form of a steady rest pin carried by the backing plate 12 to which it is riveted or otherwise secured at its end, and on which there are sleeved two compressed coil springs 64 and 66 arranged on opposite sides of the shoe and confined between the members 56 and washers 68 carried by the steady rest pin 62, the outermost washer 68 being held by a cotter pin 70. It will be seen that the pin 62 and the two springs 64 and 66 constitute a steady rest yieldingly resisting lateral movement of the shoe.

Each pin 62 passes through a relatively large opening 72 in its shoe, so that the pin does not directly engage the shoe at any time. The pin also passes through openings in members 56 which are slightly larger in the direction of brake-applying movement of the shoe than the diameter of the pin 62, by an amount equal to the desired brake-releasing movement of the shoe,—that is, the clearance of the openings in members 56 with respect to pin 62 determines the clearance of the shoe with respect to the drum when the brake is released. Cam 46 is turned by any suitable adjustment, preferably acting automatically, so that the lower ends of shoes 14 and 16 remain in engagement with each other when the brake is released.

When the brake is applied, the shoe moves with its adjusting members 56 until the openings in the adjusting members engage the pin 62, at which time normally the brake will be applied. In case, however, there has been any considerable wear of the brake lining, the shoe will continue to move slightly until it is fully applied, whereas the members 56 will be prevented from further movement by pin 62 and thus will be shifted with respect to the shoe against the frictional resistance of the attaching means including bolt 68, this shifting being permitted by the slot 60. Now when the brake is again released, the shoe will move away from the drum only so far as to give the desired predetermined clearance, after which the adjusting members 56 will again engage the pin 62 to hold the shoe in its new or adjusted idle position.

Certain features disclosed herein but not claimed are claimed in my copending application Serial No. 576,914, filed November 23, 1931, which is a division of this application.

While one illustrative embodiment has been described in detail, it is not my intention to limit the scope of this invention to the particular embodiment or otherwise than by the terms of the appended claims.

I claim:

1. A brake comprising, in combination, a drum, a pair of unconnected floating shoes engageable with the drum and the first of which thrusts the second against the drum when the drum is turning in one direction and the second of which thrusts the first against the drum when the drum is turning in the other direction, and means for taking braking torque from said shoes.

2. A brake comprising, in combination, a drum, and a pair of unconnected floating shoes having direct thrust engagement at the same ends and in both directions of rotation of the drum and engageable with the drum and one of which thrusts the other against the drum.

3. A brake comprising, in combination, a drum, and a pair of unconnected floating shoes having direct thrust engagement at the same ends in both directions of rotation of the drum and engageable with the drum and one of which thrusts the other against the drum, together with a guide holding said shoes in end-to-end engagement.

4. A brake comprising, in combination, a drum, and a pair of unconnected floating shoes having direct thrust engagement at their adjacent ends and engageable with the drum and one of which thrusts the other against the drum, together with a guide engaging opposite sides of said shoes and holding them in end-to-end engagement.

5. A brake comprising, in combination, a drum, and a pair of shoes engageable with the drum and having rounded adjacent ends in direct thrust engagement with each other.

6. A brake comprising, in combination, a drum, and a pair of shoes engageable with the drum and having rounded adjacent ends in direct thrust engagement with each other, said shoes being built up of stampings having edge flanges extended around said adjacent ends in thrust engagement with each other.

7. A brake comprising, in combination, a drum, and a pair of shoes engageable with the drum and having rounded adjacent ends in direct thrust engagement with each other, together with a U-section stamping having guide flanges engaging the opposite sides of both of said adjacent ends.

8. A brake comprising, in combination, a drum, a pair of floating shoes engageable with the drum and the first of which forces the second against the drum when the drum is turning in one direction and the second of which forces the first against the drum in the opposite direction of drum rotation, and stop devices predetermining the idle positions of said shoes and which are automatically adjusted by application of the brake in such a manner as to preserve a predetermined brake-releasing movement of said shoes.

9. A brake comprising, in combination, a drum, a pair of floating shoes engageable with the drum and the first of which forces the second against the drum when the drum is turning in one direction and the second of which forces the first against the drum in the opposite direction of drum rotation, and stop devices predetermining the idle positions of said shoes and which are independently frictionally gripped in such a manner as to be shifted automatically by brake-applying movement of their respective shoes beyond a predetermined amount.

10. A brake comprising, in combination, a drum, a pair of shoes engageable with the drum and the first of which forces the second against the drum in one direction of drum rotation and the second of which forces the first against the drum in the opposite direction of drum rotation, an applying device acting on said shoes, a separate anchor engageable by the first of said shoes when it is forced against the drum by the second, and a support for the applying device arranged to serve as an anchor for the second of said shoes when it is forced against the drum by the first.

11. A brake comprising, in combination, a drum, a pair of shoes engageable with the drum and the first of which forces the second against the drum in one direction of drum rotation and the second of which forces the first against the drum in the opposite direction of drum rotation, a separate anchor engageable by the first of said shoes when it is forced against the drum by the second, and brake-applying means arranged to serve as an anchor for the second of said shoes when it is forced against the drum by the first.

12. A brake comprising, in combination, a drum, retarding means engageable with the drum and having adjacent ends movable in opposite directions in applying the brake and arranged to anchor at one end when the drum is turning in one direction and to anchor at the other end when the drum is turning in the other direction, a separate anchor engaged by one of said ends, and brake-applying means serving as an anchor for the other of said ends.

13. A brake comprising, in combination, a drum, a backing plate, retarding means engageable with the drum and having adjacent ends movable in opposite directions in applying the brake and arranged to anchor at one end when the drum is turning in one direction and to anchor at the other end when the drum is turning in the other direction, a separate anchor engaged by one of said ends, a brake-applying device having a shaft extending through the backing plate, and a bracket in which said shaft is journalled and which is secured to said backing plate and which has a part serving as an anchor for the other of said ends.

14. A brake comprising, in combination, a drum, a backing plate having slots, retarding means engageable with the drum and having adjacent ends movable in opposite directions in applying the brake and arranged to anchor at one end when the drum is turning in one direction and to anchor at the other end when the drum is turning in the other direction, a separate anchor for one of said ends, brake-applying means including a bracket having a part engaged by the other of said ends when it anchors, and fastenings for the bracket passing through the slots in the backing plate and engaging the ends of said slots when said other end is anchored on the bracket so as to transmit the torque from the bracket to the backing plate.

15. A brake comprising, in combination, a drum, a backing plate having slots, retarding means engageable with the drum and having adjacent ends movable in opposite directions in applying the brake, brake-applying means including a bracket having a part engaged by the retarding device when it anchors, and fastenings for the bracket passing through the slots in the backing plate and engaging the ends of said slots when said retarding device is anchored on the bracket so as to transmit the torque from the bracket to the backing plate.

16. A combination cam-shaft bracket and anchor for a brake, having a bearing at its center for a cam-shaft and having an anchor projection above the bearing and formed with wings extending in opposite directions and provided with attaching means.

17. A brake comprising, in combination, a drum, a pair of friction devices engageable with the drum, and a positioning device frictionally clamping each friction device.

18. A brake comprising, in combination, a drum, shoes engageable with the drum, and stops frictionally clamping the shoe to position the shoes equal distances from the drum when the brake is released.

In testimony whereof, I have hereunto signed my name.

ADIEL Y. DODGE.